United States Patent

[11] 3,581,984

| [72] | Inventor | Werner W. Buechner<br>4407 Gladding Court, Midland, Mich. 48640 |
|---|---|---|
| [21] | Appl. No. | 803,389 |
| [22] | Filed | Feb. 28, 1969 |
| [45] | Patented | June 1, 1971<br>Continuation-in-part of application Ser. No. 707,757, Feb. 23, 1968, Continuation-in-part of application Ser. No. 632,842, Jan. 23, 1967, now Patent No. 3,470,810, Continuation-in-part of application Ser. No. 677,241, Oct. 23, 1967, now abandoned, Continuation-in-part of application Ser. No. 678,987, Oct. 30, 1967. This application Feb. 28, 1969, Ser. No. 803,389 |

[54] TEMPERATURE CONTROL DEVICE
15 Claims, 10 Drawing Figs.

[52] U.S. Cl. .................................................. 236/12, 251/133, 236/78

[51] Int. Cl. ..................................................... G05d 23/13
[50] Field of Search ........................................... 236/12, 12 A, 78 C; 251/133; 74/84

[56] References Cited
UNITED STATES PATENTS

| 608,573 | 8/1898 | Burden .......................... | 74/84 |
| 902,600 | 11/1908 | Penniman ..................... | 236/12 |
| 1,224,614 | 5/1917 | Dougan ......................... | 236/12 |
| 2,404,597 | 7/1946 | McClain ....................... | 236/12 |
| 3,132,527 | 5/1964 | Rocton ......................... | 74/84 |

*Primary Examiner*—William E. Wayner

ABSTRACT: A low-capacity water-mixing valve unit for mixing two streams of water of different temperature, using rotationally adjustable metering valves and mechanical, thermostatically controlled actuation of the metering valves, in which the water is mixed in a mixing chamber having at least 20 times the cross-sectional area of the largest orifice of the metering valves, for stabilization of the output temperature.

INVENTOR
Werner W. Buechner

PATENTED JUN 1 1971

INVENTOR
Werner W. Buechner

INVENTOR
Werner W. Bruckner

TEMPERATURE CONTROL DEVICE

This application is a continuation-in-part of my copending application Ser. No. 707,757, filed Feb. 23, 1968 and entitled Water Mixing Device and Method for Delivering a Stream of Temperature Controlled Water. This application is further a continuation-in-part of my copending application Ser. No. 632,842, filed Jan. 23, 1967 entitled Water Jacket and Photographic Processing Apparatus, now U.S. Pat. No. 3,470,810, of my copending application Ser. No. 677,241, filed Oct. 23, 1967, now abandoned, and entitled Method and Apparatus for the Wet Treatment of Photographic Materials, and of my copending application Ser. No. 678,987, filed Oct. 30, 1967 and entitled Method and Apparatus for the Control of the Temperature in Photographic Treating Solutions. The present invention concerns a device for producing a stream of temperature controlled water, and more specifically a device in which metered streams of hot and cold water are mixed to produce a stream of a desired, essentially constant temperature.

It is well known to produce a stream of temperature-controlled water by metering and mixing streams of water of different temperature, to produce a stream of water having, depending on the ratio of mixing these streams, a temperature somewhere in between. Herein, the water having the higher temperature is called "hot water" and the water having the lower temperature is called "cold water" independently of their actual temperature. The present invention relates not only to water, but also to other liquids which can be heated and mixed.

In practice, the mixing of the streams of water of different temperature may be achieved in simple mixing valves of the industrial or household type. The constancy of the temperature of the mixed stream and its accuracy depend on many factors, such as constancy of the flow rate of the individual streams which may be affected by pressure variations in either of the supply lines, or by internal change of the effective orifice of the valves. The temperature of the stream of mixed water is also affected by temperature variations in either of the individual streams. In practice, these and other uncontrolled variations are rather pronounced and it is therefore not possible to reliably maintain the temperature of the outgoing stream for longer operating periods within narrow limits e.g. of ± one-half° or less of a desired constant temperature, as is needed, for instance, for the practice of many photographic color developing processes and other commercial, industrial or scientific temperature control applications.

The temperature variations caused by pressure variations in the supply lines can be compensated to a degree by the use of pressure-compensating devices as are used, for instance, in diaphragm-controlled valves. However, to function properly, usually high flow rates are required in these devices. These devices do of course not compensate for changes of the effective orifice in the individual valves and for temperature changes in the incoming water.

A further improvement of the temperature constancy of the outgoing mixed stream is achieved by the use of the so-called thermostatic mixing valves. These devices require for proper operation likewise rather high flow rates e.g. of the order of 1½ gallon per minute or more. At lower flow rates their control function becomes erratic and unreliable. A further limitation of these known "automatic" mixing valves is, that they operate reliably only, if the temperature of the mixed water is not too close to the temperature of the incoming hot and cold water. These limitations, and particularly the high flow rate requirement make these devices undesirable for many applications, particularly for color processing practiced in the home or in locations, where only very limited quantities of hot water are available in the conventional tank-type hot water heater.

It is therefore an object of the present invention to provide a new device which produces a stream of water of essentially constant temperature independently of moderate pressure and temperature variations in the supply lines, and independent of how close the temperature of the mixed water is to that of the incoming hot or cold water.

It is another object of the invention to provide a new device, which accurately controls the temperature of an outgoing stream of mixed water even at very low flow rates.

Other objects will become apparent from the attached drawings and from the following description of the invention.

In the attached drawings,

FIG. 3 is a diagrammatic representation of the relation between the number of turns and the change of the temperature brought about by the turns in the outgoing mixed water.

The objects of the invention are achieved by a new device which comprises at least two metering means, one for a stream of water of higher temperature and one for a stream of water of lower, at least one of which has means for continuously adjusting the size of the metering orifice, means for mixing the two metered streams, means for controlling and adjusting the flow rate and orifice size of at least one of said metering means, and thermostat means, disposed with its temperature-sensitive parts in the outgoing mixed stream, and adapted to control the said variable metering means by controlling automatically the orifice size dependent on the temperature of the outgoing mixed stream of water, so as to maintain the temperature of the outgoing mixed water in a desired narrow temperature range.

Figure 1:
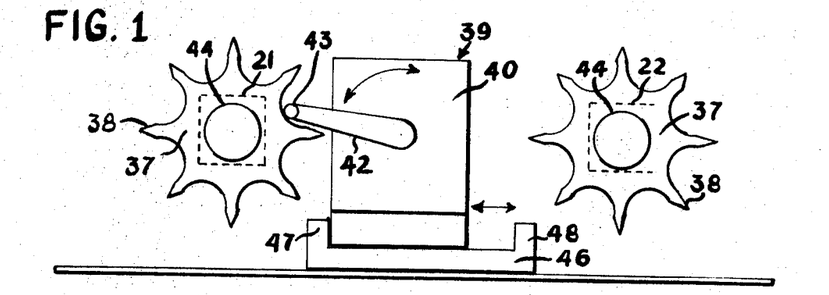
FIG. 1 is a schematic front elevation of the preferred embodiment of the automatic metering control of the valves of the device of the present invention.
Figure 2:
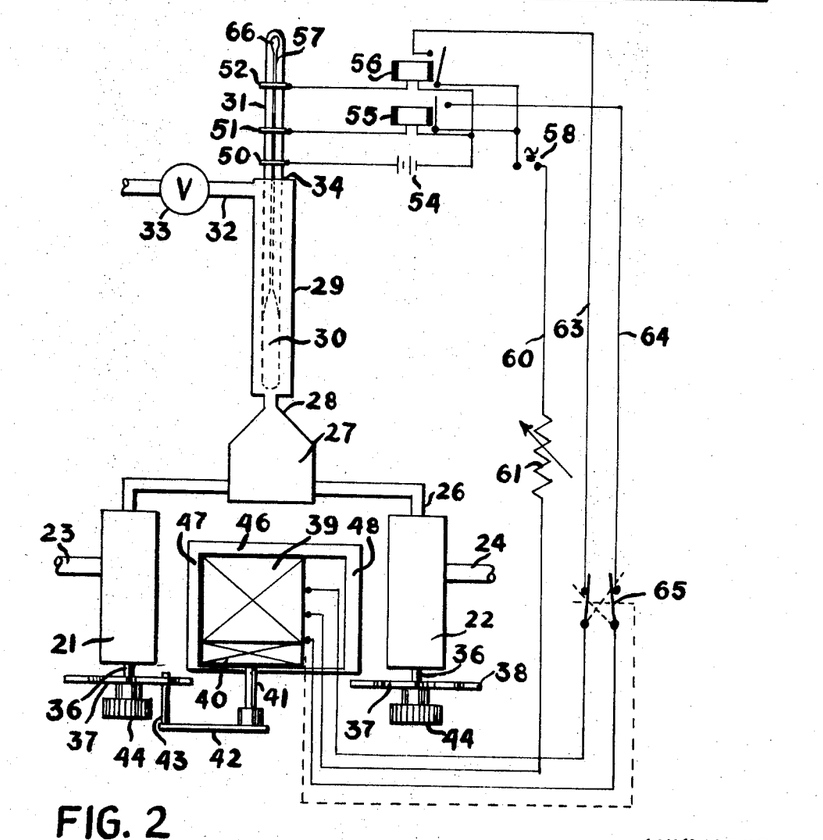
FIG. 2 is a diagrammatic representation showing the metering, mixing and thermostatic control elements and a wiring diagram of a preferred embodiment of the device of the present invention.

Referring now to FIGS. 1 and 2 of the drawings, the preferred temperature control device of the present invention comprises metering valves 21 and 22, having input connections 23 for hot water and 24 for cold water. The outputs 25 and 26 of the metering valves 21 and 22 are connected by suitable conduit to mixing chamber 27. Instead of the latter a regular, less preferred T-connector may be employed, or any other suitable mixing means well known in the art. Fins or other suitable means, which promote the mixing of the hot and cold water may with advantage be provided in the mixing chamber (not shown). The use of a mixing chamber having a relatively large cross section, measured perpendicularly to the flow direction of the water, in relation to the maximum orifice of the metering means, promotes the mixing of the two streams and has also a stabilizing effect on the operation of the device, as is set out hereinafter. The outlet 28 of mixing chamber 27, or one leg of the T-connector, if such is used, is connected to chamber 29 in which is disposed the heat-sensitive part 30 of a thermostat 31. Chamber 29 comprises outlet 32 with metering and/or shutoff valve 33 for metering or shutting off the outgoing stream of mixed water. The valve 33 may be omitted, if the system is to be operated merely under the hydrostatic pressure. Generally, it is however, preferred to operate the system under at least partial feed line pressure so that the metering of the outgoing stream of water is not substantially affected by controlling the orifice size in metering valves 21 and 22. In this manner merely a single valve 33 need be operated for controlling or changing the flow rate of the outgoing mixed stream of water. Of course, in this case, the thermostat 31 must be sealed in the chamber 29, preferably at 34, e.g. by the use of suitable gaskets and screw connectors or by cementing or the like, as is well known in the art.

Valves 21 and 22 as shown are of the threaded, rotary stem type, preferably needle valves. Each of stems 36 of these valves is provided for rotation with the valve stem with a disclike gear wheel 37 comprising pointed teeth 38. Between valves 21 and 22 is provided electric motor 39, the rotational speed of the output shaft of which is greatly reduced by a suitable gear box 40 with output shaft 41 rotating at a very slow speed as will be explained hereinafter. On shaft 41 is mounted arm 42 with finger 43 at its outer end to approximately parallel shaft 41. Finger 43, upon rotation of shaft 41 and arm 42 meshes with gear wheel 37 at the left with the motor in a position as shown. In this position of the motor, finger 43 clears the gear wheel at the right. In front of gear wheels 37 is provided knob 44 for hand operation of the valve.

The motor is set into suitable housing or support (not shown) which in turn is slideably set in bed 46 having stops 47 at the left and 48 at the right. The motor may thus be shifted from left to right and back, and is held in the extreme left or right positions defined by stops 47 or 48 by suitable releasable locking means (not shown). Of course, if the motor 39 is shifted to the right position, finger 43 meshes, upon rotation, with gear wheel 37 at the right, clearing the teeth of the gear wheel 37 at the left. Thus by shifting the motor to the right or left, it is determined which of the gear wheels is rotationally actuated by the motor.

Motor 39 as shown is of the self-starting, electrically reversible type. The thermostat as shown is of the fixed-setting mercury type having three contacts, viz contact 50 at the lowest position, which is connected to one terminal of low-voltage battery 54. Contact 51 is set slightly below the desired temperature to be maintained, and contact 52 is set slightly above this temperature. Relay 55 is connected to contact 51 and to the free terminal of battery 54, relay 56 to contact 51 and likewise to battery 54, so that either of relays 55 and 56 become activated, when the mercury in tube 57 of the thermostat rises into contact with either of contacts 51 and 52. The switch associated with relay 55 is of the normally closed type, i.e. the switch is opened when current flows through relay 55. The switch of this relay is connected to one pole of the current source 58 for motor 39 and by conductor 63 to the motor terminal controlling the rotation of the motor in one direction. The switch associated to relay 56 is of the normally open type, i.e. it is closed when current flows through the relay 56. The switch is likewise connected to electrical current source 58 and by conductor 64 to the second terminal of motor 39 controlling its rotation in the opposite direction. The third terminal of the motor is connected to the second pole of electrical current source 58 by conductor 60, in which is provided variable resistor 61 for controlling and varying the rotational speed of motor 39 in either direction. Instead of resistor 61 suitable rheostat or other speed control means such as transistorized speed controllers or mechanical means known per se may be used for the control of the speed of the motor. In conductors 63 and 64 is provided double switch 65, which in one position (as shown) connects the relay switches 55 and 56 to the terminals of the motor as explained above. In the other position, the switch reverses the connections to the motor terminals (as indicated by broken lines crossing) so that the direction of rotation of the motor, with a given setting of the relays 55 and 56, is reversed. The switch 65 may be electrically or mechanically coupled to the displacement mechanism of motor 39 in bed 46, so that the switch is automatically actuated by the displacement of the motor.

For the operation of the device, the input 23 is connected to a hot water supply line, e.g. a pipe coming from a tank water heater and input 24 is connected to a cold water line, e.g. an underground city water system. The operator preferably opens valves 21 and 22 fully by setting them by hand at knobs 44 and he opens valve 33 to permit rapid clearing of the hot and cold water lines from stale water. For this purpose, preferably a door is provided, normally closing off the whole mechanism (not shown), giving access to knobs 44 when it is opened and at the same time inactivating the just described control circuits by suitable switch (not shown). This expedient permits the operation and the temporary provision of water of a temperature different from that for which the thermostat is set. This is of importance, e.g. for the practice of the method taught and claimed in my copending application Ser. No. 678,987.

As soon as the hot and cold water lines deliver water having approximately the temperature of the supply sources, the control system is activated by closing the door or by other suitable expedient. By observing or measuring the temperature A of the mixed water with both valves 21 and 22 fully open, the operator can determine the required setting of motor 39 in its bed. If temperature A is within a few degrees of Temperature B, i.e. the temperature determined by the thermostat setting, he may shift the motor to either side, but will also partially close that of the valves 21 or 22, respectively, which is not actuated by the motor in this position.

By way of example, it is assumed, that temperature A is 103° F. and the desired temperature B is 85° F. for the temperature control of photographic color developing equipment. In this case, the motor is shifted to its left position, as shown in FIGS. 1 and 2, which results in switch 65 to assume the position as shown. Of course, if desired, switch 65 may also be designed to be operated by hand. At 103° F. the mercury column of the thermostat reaches into the upper reservoir 66 and makes contact with both contacts 51 and 52. Relay 55, being activated, opens the switch associated with it. Relay 56 is likewise activated, closing its switch and causing the motor 39 to run, with shaft 41 making a left-hand rotation. At each revolution of shaft 41 and arm 42, finger 43 causes the gear wheel 37 at the left to make a right-hand advancement by one tooth. This causes slight reduction of the orifice opening in the valve 21 to slightly reduce the flow rate of the hot water metered by valve 21, and thus resulting, as the shaft 41 keeps rotating, in a gradual lowering of the temperature of the stream of mixed water. Motor 39 continues to run until the stream of water emanating from the device, has assumed a temperature, at which the mercury column in thermostat 31 falls to the point, that it looses contact with contact 52. The outgoing stream of mixed water has now a temperature within a narrow range around 85° F. as defined by the setting of the thermostat. If for some reason the temperature of the outgoing mixed stream of water drops below the limit, the mercury column disengages contact 51. This results in the closing of the switch associated with relay 55, and in the starting of the motor 39 and rotation of shaft 41, this time in the reverse direction, i.e. shaft 41 rotates to the right-hand direction. On each revolution, finger 43 turns gear wheel 37 by one tooth to the left, resulting over stem 36 in a slight increase of the orifice, which now meters slightly more hot water into the mixture, with the result of a slight increase of the temperature of the mixed water. The motor continues operation until the mercury has risen to the point that it contacts contact 51. At this point relay 55 is energized and opens the coordinated switch resulting in the stoppage of the motor. The same procedure repeats itself every time the temperature of the outgoing mixed water falls below or rises above the range determined by contacts 51 and 52 at the thermostat.

Fixed-setting mercury thermostats may be made to be very accurate and the contacts may be readily set to fall within about 0.2° F. or better of the desired temperature. In this manner it is possible to readily maintain the temperature of the outgoing mixed stream within this narrow range of the desired exact temperature. If still closer control of the temperature is desired, e.g. within 0.1° F. or better, two separate thermostats may be employed, properly matched and selected, wherein each contains only a contact 50 and one of the contacts 51 and 52 with the coordinated electrical components and circuitry accordingly modified.

If a temperature B is desired, which is higher than Temperature A, the motor is shifted to the right to rest at stop 48 in bed 46, which results automatically in the changing of the position of switch 65, so that the connections of the switches of relays 55 and 56 to the respective motor terminals are reversed. The operation is the same as described hereinbefore, except that now the flow rate of the cold water metered into the mixed stream is modified in relation to the temperature indications of the outgoing stream of water.

As is readily apparent, to achieve the desired high precision in the temperature control, it is desirable to use precision metering valves (21, 22). Most preferred would be to have a valve which has a linear flow rate increase or decrease as the stem is turned by a given angle. Precision valves, which come close to this, are e.g. the "Ideal Needle Valves" sold by Ideal-Aerosmith, Inc. But even these valves, when installed in the equipment of the invention, do not provide an equal increment of temperature change in the mixed stream of water for a constant angle turn of the stem over the whole range. Usually, these valves produce a relatively high increase in the temperature of the mixed stream of water, when they are opened the first few turns from the closed position. In a test, a pair of this type of needle valves, having three thirty-seconds maximum orifice, was installed in the equipment. The cold water valve was fully opened and the hot water valve fully closed. Of course, in this case, the temperature of the outgoing stream was that of the cold water coming into the device. The hot water valve was then gradually opened by turning the stem one full turn at a time, while the cold water valve remained unchanged and fully open. After making each full turn of the hot water valve, the temperature increases of the outgoing mixed stream of water for each turn were measured and plotted in the diagram in FIG. 3 against the number of turns counted from the fully closed position. The curve shows, that initially the change per turn is as high as 8° F., gradually falling to practically zero at the last turns. This phenomenon affects the sensitivity and accuracy of the device of the invention, insofar that at the nearly closed end of the valve a rotation of the shaft by a given angle (as determined by the number teeth of gear wheel 37), produces an unproportionally higher temperature change than the same angle of turn produces at the nearly fully open end. There are several ways of overcoming this problem. If the device is to be operated primarily at the nearly closed end of the valve, the number of the teeth of the gear wheel 37 should be increased, e.g. to 16, 32 or 64 or more instead of the 8 shown in FIG. 1. In this manner one full rotation of the shaft 41 produces a smaller differential of the temperature of the outgoing water, i.e. the device becomes more sensitive and more accurate also in the extreme end position of the valve. This has, however, the disadvantage, that at the nearly fully open end of the valve, a given temperature change requires unproportionally high numbers of revolutions of shaft 41, i.e. the time of adjustment may take too long to accommodate quick temperature changes and to react fast enough. This problem can be overcome by varying the speed of the motor, depending on the range in which the operative valve is used. At the nearly closed end of the valve one will reduce the speed of the motor and of shaft 41 to a value, which provides the needed interim time for temperature changes caused by a change of the valve setting to become effective in the thermostat. On the other hand, if the valve is operated at the fully opened end, the motor may be speeded up to avoid the above-mentioned undesirable delay times. This variation of the speed may be readily achieved by adjusting the variable resistor 61 or by adjusting any of the other speed control means provided instead. This may be done by hand, or more conveniently, the speed variation and actuation may be coupled electrically or mechanically to the valve, e.g. by utilizing the length of protrusion of the valve stem or by use of gears, levers or the like.

Another way of avoiding the just mentioned problem is the elimination of at least the 10 or more turns in the valve which do not effect much change, e.g. by the provision of a stop ring on the thread of the valve. In this case, the speed of the motor may still be variable. If it is not, one sets the speed at an intermediate value, which satisfies the requirements over the entire range of the valve. Still another way of avoiding the problem is to reduce in those cases, where the operative range of one of the valves would fall into the extreme area of nearly fully closed, the flow rate delivered by the other valve to e.g. a fraction of full flow, such as one-third, one-half or the like. This expedient brings the operative valve closer to the most desired and most accurate medium range. Still another expedient is to use valves of different maximum orifice for hot and cold water depending on the temperature at which the device is to be operated, so that the operative valve is also in this case utilized as much as is possible in the preferred medium range.

The absolute speed of rotation of the shaft 41 depends on many factors, e.g. on the number of teeth in gear wheel 37, on the flow rate of the water, on the size of the mixing chamber and connecting conduit, on the sensitivity of the thermostat and on the range in which the operative valve is used etc. Typical rotational speeds for the shaft 41 is one-fourth turn or less to about 5 turns per second or more in unusual situations. Other speeds may be necessary with other design of the device and in other situations.

The device of the invention may be modified in many ways to meet different situations and requirements. Instead of using the rotating arm-finger arrangement, shaft 41 may be directly coupled to the valve shaft by a coupling, which provides for and accommodates the longitudinal displacement of the valve stem. With this arrangement, the speed of shaft 41 should of course be much slower than the speed ranges given hereinbefore. Instead of using one single reversible motor, a plurality of motors of different rotational direction may be used, or the shafts of the valves may be operated in the different directions as needed by the use of means adapted to mechanically reverse the direction of rotation of the output shaft. These means for mechanical reversal are actuated by relays similar to relays 55 and 56.

Other means of rotation of the valve shaft 36 may be used such as belts, pinion and gear drives etc. including a travelling chain or the like having suitable protrusions to engage in the teeth of gear wheel 37. Instead of shifting a single motor, as shown hereinbefore, for the alternate operation of the two valves 21 and 22, each valve may be provided with its own motor. The shifting of motor 39 as shown may also be effected in its bed 46 automatically instead of manually, e.g. by utilizing the current or voltage surge caused by the stalling of the motor, when the operative valve comes to the fully open position. A suitable relay may actuate a linear actuator or other suitable means well known in the art, which brings about the shift of the motor.

The needed reversal of the rotation of the valve stem may also be achieved by mechanical gear combinations and shifting devices or other suitable mechanical means. Instead of achieving the rotation of the valve stem by the rotation of a motor, the valve stem motion may be brought about by reciprocating levers and gear combinations or other mechanical means converting a reciprocating motion into a rotational motion of the valve stem.

The invention is not limited to the needle-type, rotational-stem-type metering valves. If desired, a gate-type valve or any other desired type of metering valve may be used, in which case the mechanical means actuating the valve, may be adapted to bring about the diminishing and increasing of the valve orifice in any desired manner and in accordance with well-accepted mechanical principles.

If it is not required to control the temperature over the full range provided by the difference of the temperatures of the hot and cold water, but only at one end thereof, one of the metering valves may be substituted by a suitable fixed-setting orifice. In this case, it is only necessary to provide the variation by a single metering valve with fixed mechanical actuation. By properly proportioning the orifice of the fixed-type metering device in relation to the maximum orifice of the operative metering valve, a narrower or broader range of control may be achieved, taking into account also the seasonal changes of water temperature and the differences in the hot water temperature in different locations. Preheating of the cold water, by a constant-power electrical heating element can increase the capacity of such device.

The device of the invention may also be provided with more than one thermostat of the type shown, each set at a different temperature, e.g. at 68°, 75°, 85° and 100° F. for photographic applications. In this case electrical or mechanical means are provided to activate any one of these thermostats while the others are inactive. This may be achieved e.g. by the use of a selector switch. Instead of using a plurality of fixed-setting thermostats, an adjustable thermostat, such as the adjustable mercury thermoregulators, or the adjustable bimetal thermoregulators may be used, which permit the setting of any desired temperature merely by the setting of a knob or dial.

If the device of the invention is properly designed in accordance with the foregoing teaching, it compensates not only temperature variations in the water supply, but also temperature variations in the mixed stream of water brought about by uncontrolled pressure variations in one or the other feed stream of supply lines. If these pressure variations, as may be caused by line robbing in other locations of the supply line, are frequent or too large, it is recommended to include in or combine the device with a pressure-compensating device, such as the commercially available diaphragm-type compensators or the piston-type compensators, as exemplified by the Tempera Pressure Compensating Valve.

Depending on the purpose of the device, it may be set for highest accuracy which may be up to ± 0.1° F. of a desired temperature or better, or it may be set for quick compensation and adjustment where rapid and large variations are encountered in the temperature and pressure of the supply lines. The device is equally useful for delivering a stream of water of very low flow rate of e.g. 0.5 liter per minute or less or of higher flow rates up to several gallons per minute. It delivers a stream of water having a temperature anywhere in the range defined by the temperature of the incoming, streams of hot and cold water and can be set to be equally accurate nearly over the whole range of its temperature capability. This versatility and accuracy is not available in present temperature control devices which usually are severely limited in one or the other respect. The device of the present invention therefore fills a need, particularly in the photographic color developing field, where there are no means available for the photographic amateur which control the temperature at a sufficient accuracy for color development providing at the same time a low enough flow rate necessitated by the very limited supply of hot water in the average home. This makes the device of the invention particularly suitable for the operation of my new color development equipment for the amateur, as is described and claimed for instance in my U.S. Pat. No. 3,349,689 and in my copending applications Ser. No. 678,987 (Case 33) and in my copending application Ser. No. 677,241 (Case 34) as well as in my copending application Ser. No. 746,210.

This equipment requires for its operation a running stream of water which is maintained merely in the limits of ± 2° F. of the nominal operating temperature. If used for this equipment, the temperature control device of the present invention may therefore be fitted with low-cost temperature controllers such as the Model L 6008C Ambi-Stat Controller sold by the Minneapolis-Honeywell Regulator Company. This device contains all the controls and switches required for the operation of the reversible motor, or of two independent motors set for running in opposite direction, so that the orifice of the operative metering valve is continuously varied in a range corresponding to about ± 1° F. of the set nominal operating temperature. The said Ambi-Stat has the advantage that it provides continuously variable temperature control in a range from 40° to 180° F., which range encompasses all of the operating temperatures encountered in the development of the various kinds and makes of photographic color material on the market for photographic professionals and amateurs.

In this manner a low-cost temperature control device is provided to the photographic practitioner, which fulfills the needs of the above said photographic processing equipment by providing a continuously running stream of water controlled within better than ± 2° F. of the nominal treating temperature and permitting the adjustment of the flow rate to the required low values of from 0.5 qt./min. to about 1 gal./min. This embodiment of the device is therefore particularly suited for the application by the photographic amateur in his home, where the frequent pressure changes and temperature variations in the hot and cold water supply lines make it undesirable to control the temperature of the mixed stream of water at the required low flow rates by any of the other means heretofore available.

In the temperature control device comprising the just-mentioned model of the Ambi-Stat Controller in its commercially sold form, the time-temperature curve of the emanating mixed stream of water is a sinusoidal curve having peaks and valleys of about 1 to 1.5° F. When this water is run countercurrently through the above-said processing equipment successively in a sinusoidal path around each of the tanks containing the treating solutions, the processing equipment exerts an equalizing effect on the temperature of the running water, particularly if my "thin layer heat exchange principle" is applied to best effect in this equipment. Thus, the equipment actually shaves off the peaks and valleys bringing the temperature of the running water closer to an even, constant intermediate value. Depending on the size and design of the equipment and on the flow rate of the water, the peaks and valleys may be reduced to be as low as 0.5° F. and often as low as 0.2° F. or less. This temperature-equalized water, circumflowing the temperature-critical developer tank last, is therefore in very close vicinity of the nominal development temperature, and maintains the developer in most situations within ± 0.2° F. or often within 0.1° F. of the desired nominal temperature, even though a low-priced temperature control device is used which in itself does not provide the required temperature accuracy. By emperical adjustment, one may provide also for the minimal temperature drop across the equipment and thus come very close to the desired temperature in the critical developer and other temperature-critical steps.

If this method of temperature control is not desired, the incoming water delivered by the device is used merely for controlling the temperature in the nontemperature-critical solutions, where deviations of ± 2° are permitted and one establishes the exact temperature in the developer by the use of the method of my copending application Ser. No. 678,987, using the same, temperature-inaccurate stream for the adjustment as described in said application.

If the above-said Ambi-Stat Controller is used unchanged in its commercially sold form, the motor is continuously on, rotating in one or the other direction and continuously varying the orifice of the operative valve in the limits of temperature change set by the sensitivity of the equipment. If desired, a rest period around the desired nominal temperature, as described above for the mercury thermostats, may be introduced by adding a second switch of opposite polarity, and, if desired a second bulb and relay, or by combining two Ambi-Stat Controllers of opposite switching action. In this manner, an intermediate off range may be provided instead of the continuous scanning action. By proper adjustment and matching of components, the off range may be designed to be considerably narrower than corresponds to the sensitivity of the starting equipment, thus providing a still more increased accuracy at low cost. The operation and characteristics of the device so modified are then very similar to that of the embodiment comprising the double-contact fixed-mercury thermostat described above.

Of course, if still greater accuracy in the temperature control of the emanating stream of water is desired, a precise temperature controller, such as the Model R 7081C Versa-Tran Controller, likewise sold by the Minneapolis-Honeywell Regulator Company, may be used. This device, when incorporated in the temperature control device of the invention permits the automatic maintenance of the temperature in the running water within about ± 0.15° F. or better and likewise provides continuous variability of the nominal temperature over a wide range.

The preferred new automatic temperature control device of the invention has been described hereinbefore as comprising at least one electrically operated motor as the means for controlling the orifice size of the operative metering valve. In another preferred embodiment of the device, the rotational power source is a microturbine or similar device taking the place of the electric motor. The small turbine is preferably of the reversible or two-directional type, i.e. it runs in one direction when the water enters an inlet port at one side of the rotor, and it runs in the opposite direction, when the water enters through another inlet port at the other side of the rotor. The water is thereby, after turning and passing by the rotor, dispensed through a central outlet port. The direction of rotation of the turbine may thus be controlled by shutoff valves in the incoming water lines to the two mentioned inlet ports, or by a single switching valve. The valves used for this control action are preferably of the electrically controlled type, using e.g. electromagnets for the switching action, which is needed for the operation of the device in the manner described hereinabove. Instead of the switches, energizing the motor windings for rotation in one or the other direction, the valves are substituted and are opened or closed, respectively, when energized or deenergized, respectively, by the activation or deactivation by the relays 55 and 56 in a circuit suitably adapted and modified to connect to the electrical controls of the shutoff valves instead of the motor windings. The output shaft of the turbine motor is provided with suitable mechanical means to actuate the shaft of the metering valve 21 or 22, respectively, at the proper required speed as described hereinbefore. The operation of the device is very similar to that described hereinbefore, except that the shutoff valves feeding the forward and reverse inlet ports are actuated by the thermostat. Of course, if both valves are closed, viz when the mercury column of the thermostat is in the range between contacts 51 and 52, the turbine does not run. It runs in one direction, when the mercury column falls out of contact with the contact 51, and it runs in the opposite direction, when it reaches contact 52. This action is achieved, as described before, by suitable combination of the relay and switch types and of the suitable types of electrical valve actuation means.

The microturbine may be fed by cold water, taken from the inlet supply line, before the water is metered in the metering valve. In this case, the turbine runs in either direction at an approximately constant speed. In a more preferred embodiment of the turbine mixing valve, the turbine is driven by the mixed stream of water, i.e. by the stream of water obtained after metering and mixing of the hot and cold water. This embodiment has the advantage, that the rotational speed of the turbine varies with the flow rate at which the mixed, temperature-controlled water is taken from and leaves the mixing valve. At low flow rates, the turbine runs relatively slow and at high flow rates it runs correspondingly faster. In this manner, the reactivity of the mixing valve as a whole, and the speed of adjustment of the orifice of the operative metering valve is varied and properly adjusted and adapted to the requirements of a given flow rate, so that the maximum sensitivity and performance of the mixing valve is assured at any given flow rate of the mixed water. Of course, if the flowing mixed, temperature-controlled water is is used as the source of energy for the turbine motor, a third shutoff valve may be provided, which opens and lets the water pass to the outlet end of the mixing valve, if both turbine valves are closed, as stated above. This valve may be simply of the spring-type check valve, which opens when the pressure rises to a certain, predetermined level. Alternatingly, a third electrically or mechanically controlled valve may be used and controlled electrically or mechanically by the respective positions of the turbine valves. The outlet port of this valve is connected the same as the outlet ports of the turbine valves, to the outlet of the mixing device, so that the water runs continuously regardless of which valve is opened.

If both valves 21 and 22 are alternatingly to be controlled by a single turbine motor, it is in this embodiment of the device preferred, to achieve the change from one valve to the other by mechanical couplings, levers or the like, activated and deactivated, as required, by e.g. suitable electrical or mechanical devices, when the operative valve stalls or comes to the fully open position. In this case, such means are preferred because of the water connections to the turbine. Of course, these means for achieving alternating operation of the two metering valves may also be used with the electrical motor embodiment of the mixing valve.

Instead of using a rotary-type turbine, a reciprocating-piston-type power source may also be used and operated by the stream of water. Generally, the principles known from the steam cylinder, having piston-operated inlet and outlet ports, may be readily adapted. The plunger is advantageously provided with a lever, reciprocating with the plunger and being adapted to engage or push by its free end the closest tooth of the gear wheel 37 by permitting an outward curved motion of the free end. Other mechanical means for translating the reciprocative action into a rotational motion of the stem of the metering valve may be used. The reversal of direction of advancement of the metering valve stem may be achieved by electromechanically lifting or lowering of the free end of said lever, so that, for one direction of rotation, it contacts and pushes forward the teeth in the upper half of the gear wheel, and for rotation in the other direction it contacts and pushes on the teeth in the lower half of the gear wheel. The lifting and lowering of the free end of the lever may be achieved, e.g. by the use of an electromagnetic lifter, which reciprocates vertically upon deenergization or energization, respectively, with a sleeve at the free end, through which the said lever is slideably set. In this case, the thermostat requires only one of contacts 51 and 52, respectively, so that in the case of the above-said Ambi-Stat Controller a single-pole switch model may be used.

Instead of using the electrically operated thermostat, bimetal elements may be used instead for the operation of the switches or turbine valves etc. It is to be noted, that this embodiment differs from the known thermostatic valves, in that the bimetal element is merely used to control in a relay action electrical switches or simple shutoff control valves, but not directly the metering valves. In the known mixing devices, comprising the bimetal elements, the bimetal elements are controlling directly the metering valves. This is, as the practice shows a less accurate control method, which requires the relatively high flow rates for accurate functioning of the equipment. The relay action of the bimetal elements in the mixing valve of the present invention solves this problem. The bimetal elements may be set to operate or activate the switches or shutoff valves in the turbine or piston embodiments at one set temperature, e.g. at about 75°, 85° or 100° or the like, or they may be provided in known manner with means permitting their becoming active at any desired temperature set by these means e.g. by an adjustment dial or the like. Any of the modifications, improvements and additions, described hereinbefore in connection with the electrically powered embodiment of the hydrodynamic mixing valve of the invention, may also be, suitably adapted and modified, incorporated in the water-powered turbine or piston embodiments. In the foregoing, no thermometer was shown in the mixing valve. Of course, such thermometer may be advantageously included, with its temperature-sensitive member in the outgoing mixed stream of water.

In the embodiments of the temperature control device of the invention, described hereinbefore, the power-producing means, such as the electromotor, the water turbine or the equivalent linear actuating means operate at any one time only one of the hot- and cold-water-metering valves. In a preferred embodiment of the device of the invention, the power-producing means operate both the hot- and cold-water-metering valves simultaneously and in opposite sense, i.e. when the orifice in the hot-water-metering valve is increased, the orifice in the cold-water-metering valve is simultaneously decreased and vice versa. In this manner, the provision for shifting the motor or the other power producing means, e.g. in bed 46 is not needed. Likewise, reversal switch 65 is then not required. This type of operation is best achieved in an embodiment of the device, in which the hot- and cold-water-metering valves are both adjustable and both of the rotary stem type, preferably needle valves as described above, and in which the stems are engagingly connected by suitable mechanical means causing their mechanical coupling, so that one stem drives the other in an opposite direction of rotation. This may be achieved in simple manner by providing the stems of the valves with cooperating gear wheels or with drive wheels connected by crossing belt, string, chain or the like. If both valves require about the same number of turns from fully open to fully closed, the gear or drive wheels are preferably of equal size so that the rotation of the stem of one of the valves by a given angle produces rotation of the stem of the other valve by an equal angle, however, in opposite direction or sense. In this manner the reversible motor or other power source need be operatively connected to only one of the valve stems, and can be mounted in a fixed position obviating all the changeover means described above. Of course, one of the just-mentioned gear wheels or drive wheels should have a considerable axial expansion, so as to compensate for and make possible the coaxial displacement of the stem as it is rotationally operated in relation to the other stem being displaced in opposite direction. Alternatively, the gear wheels or drive wheels may be coaxially slideable on the stem, rotationally locked and restrained to remain in the same plane regardless of the position of the stem.

If desired, two motors may be used, instead of the reversible motor. In this case, both motors may be associated to a single valve, driving the other indirectly, both motors having opposite direction of rotation. Alternatively, one each of the separate motors may be associated to one of the valves. In this case the direction of rotation of the motors should be the same in the mounted position of the motors. The relays 55 and 56 operate in this case one of the two motors by suitable adaptation of the circuitry described hereinbefore. Of course, if a single motor is used, the reversal of the direction of rotation of the output shaft 41 may also be brought about by mechanical shifting means known per se and electromagnetically or electrically operated by the relays 55 and 56 instead of the direct electrical reversal of the motor described above. Similar simplifications may be achieved in similar manner in this embodiment of the device comprising the water turbine or the reciprocating power-producing means.

The mechanical coupling of the two metering valves, as just described, has several advantages. It permits not only the simplification of construction and lower cost of the equipment, but has also a number operational advantages. The temperature control device, constructed in this manner, is capable of steplessly establishing any desired temperature in the range between that of the cold water and that of hot water coming into the device, as called for by the thermostat. It is also capable of steplessly varying, during its control function, the setting of each of the metering valves from fully open to fully closed. For best operation, the metering valves are mechanically coupled in such manner, that the hot water valve is fully open, when the cold water valve is fully closed and vice versa. In this manner, one metering valve operates in the left part of the curve in FIG. 3 of the drawings, while the other valve operates in the right part of the curve with the result of making the device more sensitive in the middle range and in the range at the far right, i.e. operating both valves at the same time in opposite directions has an equalizing or flattening effect on the curve, making the operation of the device more even over the whole range and equalizing to a degree the sensitivity and reactivity. This is an important improvement, because it reduces the need for speed variation of the power-producing means in relation to how far one or the other valve is opened and which part of its range is used. In the example given in FIG. 3, the temperature increase per turn will only vary between about 2° F. per full turn at a setting of about 11 turns, and about 8° F. at both ends, i.e. by a factor of only about four, which can be readily compensated for by a medium speed of the power-producing means, which will be set for an intermediate sensitivity of about 6° F. per turn to give the desired sensitivity and reactivity. In the single-operative-valve device described above, the factor is greater tan one to 16 over the whole range of the valve. In other words, for most applications the speed control device, such as resistor 61, may also be deleted in the two-operative-valve device.

Figure 4:
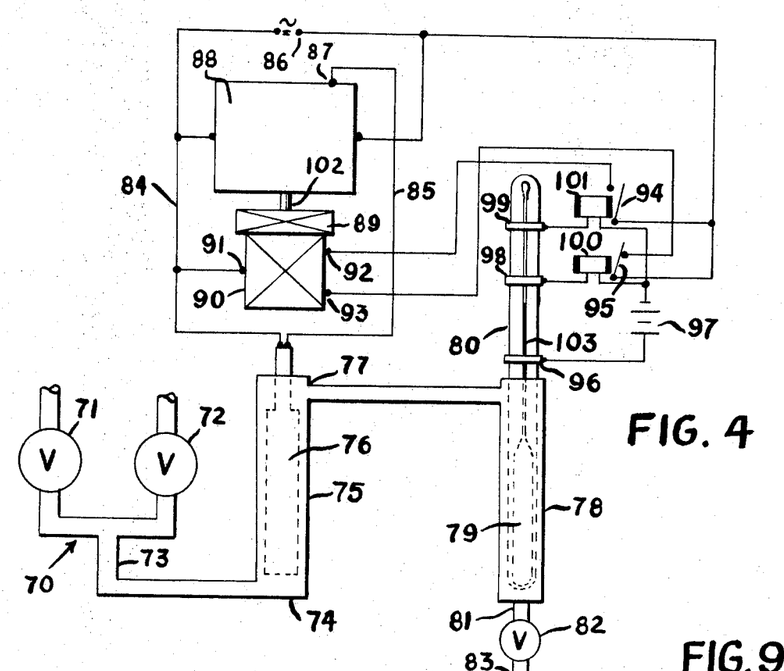
FIG. 4 is a diagrammatic representation of another embodiment of an automatic temperature control device of the present invention.

The temperature control device, described hereinbefore, achieves temperature constancy by thermostatically controlling and adjusting the flow rate of at least one stream of incoming water. The present invention concerns also a device, as is illustrated in FIG. 4, in which the temperature of a stream of water is maintained at an essentially constant level, by thermostatically controlling and adjusting the electrical input into an electrical heating element, which continuously exchanges the heat generated by said electrical current with the stream of water passing by said heating element.

It is known from my U.S. Pat. NO. 3,337,714 to heat a stream of cold water, having an essentially constant flow rate in steps to a temperature, somewhat below a desired temperature and adding to the stream of water the heat energy required to bring it exactly to the desired temperature, e.g. by an adjuvant heating element of small heat capacity, in which the heat output is controlled and set at an essentially constant value by the use of a rheostat, resistor or the like. This device depends for accurate operation on the constancy of the temperature and flow rate of the incoming water and of the power supply.

The temperature of a flowing stream of water may also be controlled by the use of a thermostat, which normally over a relay shuts the heater on and off as may be needed. With this method, the streaming water does not have a constant temperature, but its temperature fluctuates in relatively wide limits between on and off periods. To render this method satisfactory, one must use a heater of very small relative capacity, e.g. of a heating capacity which varies the temperature of a given stream of water between on and off cycles by no more than one-half° or less. This of course, has the disadvantage, that the heating element can compensate only for minimal temperature variations falling into this narrow range.

Contrary to this, the new device of the invention does not require an essentially constant flow rate nor an essentially constant temperature of the incoming stream of water close to the desired temperature. The heating element employed in the device of the present invention has preferably a high heat capacity, e.g. one corresponding to a temperature rise of the flowing stream of water of up to 10° F. or more up to 20° F. or even more. It is to be appreciated, that, the larger the relative heating capacity of the electric heating element, the greater is the temperature variations the device is capable of compensating for. This is exactly contrary to the experience of the prior art and will be explained in detail hereinafter. The new device of the present invention comprises a heating element, a thermostat in the outgoing stream of water, and mechanical and/or electrical means for continuously and accurately controlling the supply of electrical power or current to the heating element, so that the outgoing water has at all times exactly a temperature in the narrow range defined by the thermostat.

Referring now to FIG. 4, the new device is fed by a stream of water, e.g. as obtained in a conventional household or commercial water-mixing valve, or by a diaphragm-controlled valve or the like as is indicated at 70. This device comprises in its simplest form two manually controllable valves 71 and 72 which are fed from a cold and hot water line, respectively, and in which the water is mixed in a T-connector or the like in conventional manner. The output 73 of this device is connected to inlet 74 of heating chamber 75, in which is contained electrical heating element 76, such that the flowing water passes preferably in form of a very thin layer over the entire surface of the heated parts of this element 76. The outlet 77 of the heating chamber 75 is connected to the inlet of thermostat chamber 78, in which is contained the heat-sensitive part 79 of a thermostat 80. The outlet 81 of the chamber 78 is provided with a shutoff or metering valve 82 to permit the operation of the system under increased pressure and for convenient metering of the outgoing temperature-controlled stream of water. The outlet 83 supplies the temperature-controlled water. Of course, the heating element 76 and thermostat 80 are in this case set pressure tight into their respective chambers. If desired, the valve 82 may be omitted and the system may be operated merely under the hydrostatic pressure of the water. In this case the heater chamber and thermostat chamber may be open at the top and the respective elements may be simply inserted or suspended therein.

One terminal of heater element 76 is connected by conduit 84 to one terminal of power source 86. The other terminal of the heater element is connected to the selector output 87 of rotational rheostat 88. The shaft of the rheostat 88 is coupled, over gear box 89 for the speed reduction of the motor shaft, to motor 90. Instead of rheostat 88, a variable resistor or other electrical and/or mechanical means for varying the input of electrical energy to the heating element in continuous fashion may be substituted.

Motor 90 is of the self starting, reversible type, preferably electrically reversible, with terminal 91 connected to one terminal of power source 86 and the other two terminals 92 and 93 connected over relay-operated switches 94 and 95, respectively to the other terminal of the power source 86. Switch 94 is of the normally open type, i.e. it will be closed, when relay 101 is energized. Switch 95 is of the normally closed type, i.e. it will be opened when relay 100 is energized. The thermostat 80 is the fixed-setting mercury type and comprises contact 96 which is connected to one pole of low-voltage battery 97 and contacts 98 and 99, which are connected over relays 100 and 101, respectively, to the second pole of battery 97. Instead of the battery 97 any other suitable low-voltage electrical power source may be used. Instead of the fixed-setting thermostats variable thermoregulators or bimetallic variable thermostats may be used.

For the operation of the device, the operator opens valves 71 and 82 in a ratio, which produces a stream of water being within a few degrees of the temperature B, i.e. the temperature desired in the stream of water emanating at 83. By opening valve 82, the operator adjusts the flow rate of the emanating water approximately to the desired rate. It is assumed, for the purposes of the example, that the heating element 76 has a capacity of raising the temperature of the streaming water at the set flow rate by about 20° F. and the contact 98 of the thermostat is set at the level of 99.9° F. and the contact 99 at 100.1° F. Assuming, that the water emanating from mixing valve 70 has a temperature of about 90° F. instead of the desired 100° F. the mercury column in the thermostat 80 will be out of contact with all contacts and switch 95 is closed, because relay 100 is deenergized. Switch 95 being connected to the motor terminal, which provides right-hand rotation of the motor or of the output shaft 102 of the reduction gear box 89, respectively, to gradually increase the setting of the rheostat for greater voltage and current output at sliding contact 87. In this manner heating element 76 is supplied with gradually increasing electric power, heating the water, streaming by its surface, to a higher temperature. When the rheostat has achieved a setting, at which the water temperature, of the water emanating from the heating chamber, has reached a temperature of 99.9° F. contact 98 is contacted by the mercury column 103. This results in the energization of relay 100 and the opening of switch 95, with the result that the rotation of motor 90 is stopped. As the mercury column rises further, it contacts contact 99, which results in the closing of switch 94, causing motor 90 to rotate in the opposite direction. This rotation stops as soon as the mercury column falls and disengages contact 99. In this manner, the rheostat is zeroed in on a position where the heat supplied by heating element 76 exactly equals the difference of the heat energy of the flowing stream at output 73 and that needed for the exact temperature to be maintained at output 83. If for any reason, such as pressure changes or a temperature change in the supply lines, or a change in the effective opening of one of the valves 71 or 72 or for any other reason the temperature of the incoming water stream at 74 changes up or down, the thermostat will immediately sense this deviation and start, in the manner described before, rotation of the motor, until equilibrium or the exact balance of heat input by the heating element has been restored. In this manner, the temperature is continuously maintained exactly within the temperature range defined by the spacing of the contacts in the thermostat. Since the heating element may be designed, without detriment to the accuracy of the device, with as large a heating capacity as may be desired, the device is capable of handling even large temperature variations in the incoming water as they may occur by line robbing elsewhere in the water system or by drifting of the effective orifice size of the valves or the like. For other applications of the device of the invention, e.g. as a supplement to relatively accurate manual valves, or to diaphragm-controlled mixing valves etc. the capacity of the heating element may be small, e.g. only 1° or 2° or a few degrees as may be needed.

Preferably the incoming water is set at a temperature about halfway between the maximum temperature differential which can be handled by the device, thus providing for the possibility of handling and compensating for temperature increases as well as decreases. Where necessary, a pressure compensating device may be included in the supply lines, e.g. of the piston-type valve, as described hereinbefore. The sensitivity, accuracy and uniformity of temperature control depends on the accuracy of the thermostat and on the rotational speed of the output shaft 102 of the reduction gear box in relation to the flow rate of the water and the length and volume of the path between the heating chamber and the thermostat chamber. For greatest sensitivity of the device, it is therefore preferred to design these chambers as narrow structures, and keep the connection between these chambers as short as possible. The thermostat may be selected for highest accuracy, if necessary with the use of two separate thermostats set at about the same temperature, selected for leaving a small gap of e.g. only 0.1° F. or better. For most applications in color photography, it is usually sufficient if the thermostat provides a temperature of e.g. ±one-half° or better. A plurality of fixed-setting thermostats, with different temperature settings of e.g. 75°, 85° and 100° F. the most used temperatures in color photography, may be provided in conjunction with a selector switch to activate any one of them as desired. If desired variable or continuously adjustable thermostats or thermoregulators of the mercury type or of the bimetal type may be used instead of the fixed-setting thermostat described hereinbefore.

The output speed of shaft 102 of the reduction gear box 89 should be very slow. Depending on the above stated relations and factors, it may be as little as 0.1° angular turn or less per second or it may be up to several degrees per second. Preferably, means are provided which permit the variation of the motor speed and/or of shaft 102 to permit adjustment of the shaft speed to any given situation for highest accuracy and greatest sensitivity. For this purpose, rheostats, variable resistors or other electrical means for varying the speed of the motor, or mechanical means as clutches, variable gears etc. for varying the speed of output shaft 102 may be provided. It is also of benefit to provide electrical contacts or other means, which actuate a warning signal, such as a bell or the like, when the rheostat controlling the heat output of the heating element, should reach one or the other end position, i.e. when the temperature of the incoming water should have wandered out of the range which the device is capable of handling. The motor 90 may be mechanically connected to the shaft of the rheostat in any other desired manner, e.g. by gear drives, belts, chains, etc. the rheostat 88 or variable resistor etc. used in place thereof may also be of the slideable linear type or of any other desired type. The actuation and mechanical drive mechanism for the variation of the electrical power control means for the control of the heat output of the heating element will in this case be suitably adapted to bring about the continuous or approximately continuous variation of the heat output of the heating element as is set out hereinbefore.

The just-described device may be used with particular benefit and for excellent, very accurate temperature control in all those cases, where a running cold-water supply such as water taken from an underground city water system or from a reservoir, is continuously to be heated to an accurate, uniform higher temperature, which is only moderately higher, e.g. from a temperature of say 40 to 65° F. to 68° F. or 75° F. or so. In this case, of course, mixing valve arrangement 70 will not be needed and the cold water supply leads directly into input 74. If the temperature differential is too great to be handled by one single heating element of moderate capacity, one or several heating elements, continuously run at full capacity and uncontrolled, may be included in the path of the incoming water to provide a preheating of the water to a temperature, which the device can handle.

It is to be noted, that the accuracy of the temperature control device of the invention, beyond a point, increases as the heat output and heating capacity of the variable heating element is decreased. The development of the proper relation of heating capacity and maximum accuracy depends therefore on the individual situation and circumstances.

The embodiment of the device of the invention comprising the additional heating elements, e.g. in a manner as taught and claimed in my U.S. Pat. No. 3,337,714, in combination, is of particular value for the development of photographic color film and paper materials in small portable field units, requiring only small flow rates of the water of e.g. one-fourth liter per minute to 1 gallon per minute or so. Such units are portable and can be operated from a well or a small water tank with electrical power provided by public power lines, by a small generator or by a battery or the like, permitting on-the-spot development of film and particularly color film under excellently controlled conditions and supplying at the same time the needed wash water of the right temperature, even in far out, isolated locations.

It becomes apparent from the foregoing, that the temperature control device of the present invention, using the variable input heating element, is of particular benefit as a secondary control element, e.g. in combination with a diaphragm-controlled mixing valve and especially in combination with the manual precision mixing valve to be described hereinafter, particularly in locations, where the temperature constancy of the supply lines is not ideal. In this case, the heating element and all the other components may be designed with small capacity, since the unit serves merely to level out small minor variations for maximum accuracy and temperature constancy. In this manner the device may serve as the means for improving greatly the performance of existing temperature control equipment at minimum cost.

Any of the modifications, variations, substitutions and improvements set out hereinbefore for the hydraulic temperature control device may with advantage be adapted and incorporated in the just-described control device employing the caloric principle of temperature control for meeting any special circumstances or special situations. The just-described temperature control device can be employed with particular benefit in the photographic multistep processor described in FIGS. 1 and 2 of my copending application Ser. No. 632,842, in which a stream of temperature-controlled water is circulated in a sinusoidal path around a plurality of treating tanks. The caloric device of the invention permits to add to the circulated water continuously and evenly just that amount of heat energy, which the water has lost in its passage through the bath. In this manner, very close temperature control e.g. in the critical developing step is possible, if desired, with an accuracy of about 0.1° F. or better. In this manner the temperature control in this processor is unsurpassed and exceeds in accuracy by far those which operate on the standard water-jacket principle.

The just-described caloric device of the present invention is also particularly suited for the temperature control of the photographic drum processors, such as Kodak's Rapid Drum Processor, and especially for a drum processor as taught and shown, for instance, in FIG. 20 of my copending application Ser. No. 677,265, filed Oct. 23, 1967, of which the present application is also a continuation-in-part. In this case a supply of water is filled into the drum and circulated, e.g. by a small pump, through an external heating and thermostat chamber containing an automatically and thermostatically controlled variable-output heating element as described hereinbefore, and a thermostat in the thermostat chamber, respectively. The heating element, controlled in the manner described hereinbefore, supplies exactly the amount of electrical energy required for maintaining the temperature of the water exactly at the required level. If a fixed-setting mercury thermostat is used, as described before, the temperature may be readily maintained in very close limits, e.g. 0.1° F. or 0.2° F. of the desired operating temperature. This exact temperature control of the water in the drum can be achieved at very minimal cost and at much less cost than is available in present commercially sold drum processors.

The present invention concerns also a new water-mixing and temperature control device, which is operated manually and which comprises at least one, and preferably two adjustable precision metering valves.

The conventional manual mixing valves, of the common household or industrial type, are generally operated in such manner, that the two valves for hot and cold water are used to determine not only the ratio of the flow rates of the hot and cold water, but also for setting the overall flow rate of the mixed water emanating from the valve. This makes the operation and adjustment of these mixing valves very difficult, awkward and cumbersome. It has therefore been proposed, to add to the mixing valve a shutoff valve, which permits the shutting off of the mixed stream at the end of an operating session, so as to save the trouble of newly adjusting the temperature of the valve every time it is to be used. If this shutoff valve is to be used as a metering valve for controlling the flow rate of the emanating mixed water, and fully opening at least one of the metering valves and adjusting the other for control of the temperature, it was found that the mixing valve becomes extremely instable. Small changes in the water pressure of one of the supply lines brings about unproportionally great temperature changes in the mixed water, so that a mixing valve operated in this manner becomes completely unsuitable for use in reliable temperature control even under favourable conditions.

It was now found that such valve system becomes much more stable, and accurately delivers water of a nearly constant temperature for long times, if the hot and cold water, after being metered in separate metering valves, is flown into a mixing chamber, which has a cross section, measured perpendicularly to the direction of flow of the water through the mixing chamber, which is a great multiple of that of the maximum orifice of either of the metering valves in the mixing train. Marked improvement of the stability of the temperature of the water delivered by the valve system is to be noted, when the said cross section of said mixing chamber is at least about 10 times the cross section of the metering valve. Preferably, the cross section of the mixing chamber is 15 times or more, and most advantageously 20 to 30 times or more that of the effective cross section of the maximum orifice of either of the metering valves in the mixing train, i.e. of the valves for metering the incoming hot and cold water. There is an upper practical limit at about 40 to 50 times the cross-sectional area for the mixing chamber, solely due to the fact, that if the mixing chamber gets too wide, the speed of flow of the water in the mixing chamber becomes too slow so that the thermometer will react too slowly to temperature changes. However, this limitation is a relative one, and depends on how much stability one wants to sacrifice for speed of temperature indication, in other words this limitation is not absolute and not binding.

Figures 3, 6:
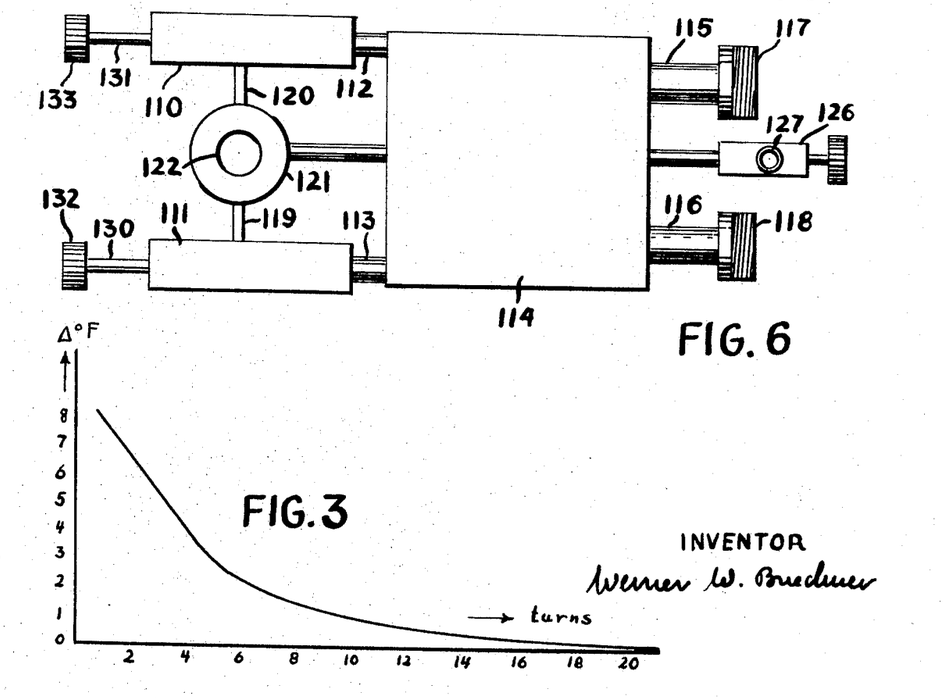
Figure 5:
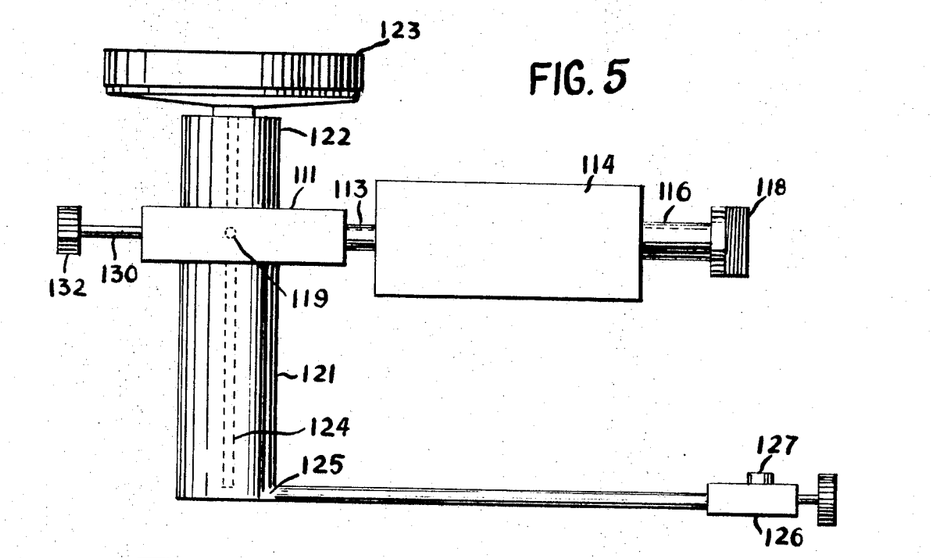
FIG. 5 is a schematic side elevation and FIG. 6 a schematic top elevation of a preferred water-mixing device of the invention for manual operation without the automatic control feature.

The new, inventive concept underlying the device of the invention is demonstrated, by way of example, in a new manually operated water-mixing valve as illustrated in FIGS. 5 and 6 of the accompanying drawings.

The device comprises a precision metering valve 110 for the incoming hot water and a precision metering valve 111 for the incoming cold water. Both valves are of the manually adjustable, needle-type construction, having e.g. a maximum orifice of three thirty-seconds inch, i.e. when the valve is fully opened, its free passage corresponds to a circular passage of 3/32-inch inside diameter. The inputs 112 and 113, respectively, of these valves are connected to the output openings of a pressure-compensating device 114, e.g. of the moving piston type such as the Temperature Valve, properly modified for increasing the accuracy and sensitivity by increasing the number of the passageways in the piston for more ready movement over that normally used. The inlets 115 and 116, respectively, of the pressure-compensating valve 114, are provided with screw connectors 117 and 118, respectively, for the connection of the device over pressure tubing leading to a hot and cold water faucet or outlet, respectively. The device may also be permanently connected to a hot and cold water line by piping connections etc.

The outlets 119 and 120, respectively, of metering valves 110 and 111, are connected to mixing chamber 121. The mixing chamber 121 is provided at the top end with threaded opening 122 for the insertion of a stem thermometer 123, e.g. of the bimetallic dial type, the stem 124 of which preferably reaches nearly to the bottom of the mixing chamber, while the said output connections of the valves 110 and 111 are at or near the top end of the mixing chamber. For the sake of clarity the thermometer has been omitted in FIG. 6.

At the low end of the mixing chamber is provided outlet passage 125 for the mixed water, continuing in tubing leading into outlet metering valve 126 with threaded output connector 127 at the end for connection of pressure tubing or the like, for leading the mixed, temperature-controlled water to the place of use, e.g. a photographic color processor or the like. The valve stems 130 and 131, respectively, are provided with knobs 132 and 133, respectively, for manual adjustment of the flow rate delivered by each of the valves. The valve stems may be provided with pointers cooperating with circular dials (not shown) as taught in my copending application Ser. No. 707,757.

For the operation of the device, input 117 is connected to a supply of running hot water, e.g. from a tank-type gas or electric heater. There will be a certain drop of the temperature of the hot water in the piping leading from the heater to the temperature control device depending on the length of the line and on the flow rate at which the hot water runs. The temperature drop is uniform and an equilibrium temperature establishes itself, as long as the water is run at about the same, constant flow rate. Insulation of the hot water line will of course keep the temperature drop at a minimum and permit variation of the flow rate in wide limits, without substantially changing the temperature of the hot water at the location of the temperature device. Input 118 is connected to a cold water supply, e.g. the cold water line of a well or an un-, derground line of a city water supply or to a reservoir etc. The same comments as to temperature constancy, except in reverse, apply to the cold water line. Sometimes, particularly if the line is very long or passes by heat sources, it is therefore of benefit, to insulate also the cold water line.

With the supplies of hot and cold water opened the operator opens both valves 110 and 111 fully for flushing the supply lines of stale water. As soon as the thermometer indicates an essentially constant temperature, the operator dials the desired operating temperature, e.g. 75°, 85° or 100° F. or any other temperature he may desire, by closing gradually either one of the valves in part, until the thermometer shows the desired temperature. This is a quick, simple operation because of the stability of the new device. Gradually turning either of knobs 132 or 133, respectively to the right will slowly increase or decrease, as the case may be, the temperature indication of the thermometer and in a short time the exact temperature has been established. Thereafter, or if desired, before making the temperature adjustment, the exact flow rate of the emanating mixed water may be set by partially closing or opening metering valve 126, which need not be of the same accuracy as the valves 110 and 111. A device, constructed in the above described manner, and employing 3/32-inch maximum orifice precision needle valves obtained from Ideal-Aerosmith Company and a mixing chamber 121 having ½-inch diameter, permits to produce a stream of mixed water, flowing continuously at a rate of less than 0.5 qt. per minute to about 1 gallon per minute, as may be desired, and depending on the water pressure in the supply lines. The temperature varies over long time periods in a range of less than ± 2° F., and usually, with occasional adjustment, may be readily maintained within ± ½° F. of the desired temperature without rarely a noticeable variation of the temperature of the emanating mixed water in case of the use of hot and/or cold water elsewhere in the system (line robbing). Variation of the output flow rate of the mixed water, provided the connecting lines to the supply are short or insulated as explained above, does not affect the temperature constancy of the outgoing mixed water. The exceptional, unexpected stability of the temperature is not obtained, if the wide cross section mixing chamber 121 is replaced by a narrow mixing tube, or if the valves are replaced by such valves which have a much greater maximum orifice. The stability of the device is actually so great, that the pressure-compensating device 114 may be omitted, except under very unfavorable, greatly varying pressure situations, without substantially affecting the stability of the device.

The just-described device may be varied in many ways. One of the adjustable metering valves may be replaced by a fixed orifice inlet of similar size as the maximum orifice of the adjustable valve. The adjustable valves may be provided with different maximum orifice sizes, e.g. in a ratio of 1:2, 1:3 etc. as long as the above stated ratio of the maximum orifice size of the metering valves and the mixing chamber are maintained. Other types of precision metering valves may be used, preferred being those which have a relatively small maximum orifice and which provide a change of the flow rate per turn which approaches as much as possible a straight line (see FIG. 3). Best suited for the device of the invention, the same as for the automatic hydraulic valve described hereinbefore, is a valve which provides a constant increment of increase or decrease of the flow rate for each full turn over the entire range.

The components may be arranged in the valve device of the invention in any other manner as long as the above stated effective cross section ratio is maintained. The pressure-compensating device may be omitted, if desired. The device, incorporating the inventive concept of the present invention provides surprisingly a stable, essentially constant temperature in the outgoing stream of water, and is, in spite of its simple, straightforward design far superior to the conventional manual mixing valves. It is particularly valuable for the temperature control of photographic color developing processes by the amateur in his home, because it permits accurate temperature control with extremely low flow rates, which cannot be done with conventional mixing valves. Its excellent operation with flow rates as low as ½ qt. per minute indicates its use particularly where only limited supplies of hot water are available. The new manual temperature control device of the invention is therefore of particularly value and especially suited for the supply of a continuously running stream of temperature-conditioned water for the operation of my new, water-saving photographic color developing equipment mentioned hereinbefore.

The principles set out hereinbefore for the manually operated mixing valve may with particular benefit also be applied in the construction of automatically controlled valves, and particularly also in the construction of the hydraulic automatic mixing valve described hereinbefore.

The mechanical coupling of the two metering valves, as described hereinbefore for the automatic temperature control device, may with equal benefit also be employed in the just-described manual embodiment of the mixing valve device. For this purpose, the stems of the two metering valves are provided with mechanical means, mechanically connecting the valve stems, so that the rotation of the stem of one of the valves causes rotation of the stem of the other valve in opposite direction. In the simplest form of the device, the stems are provided with meshing gear wheels or drive-wheel-crossed belt, chain or string drives following the size relations as set out hereinbefore for the automatic valve. This expedient produces a flattening of the response of the device on temperature change per turn of the stem of the valve and results in a more even response of the temperature of the emanating water to constant angle turns of the valve stem over the whole operative range of each of the valves.

The new temperature control devices described hereinbefore are excellently suited for the control of the temperature of photographic treating solutions while contained in the new photographic trays of the invention.

For the developing of photographic materials, and especially of photographic color materials, in standard trays, it is generally recommended to place the tray for the control of the temperature into a larger tray or vessel containing water of the desired temperature. In practice, this procedure has not proven satisfactory. When tilting the tray, as is necessary, the water splashes around, and often into the treatment tray, diluting the treating solution to the detriment of the quality and accuracy of the photographic product.

If the differential between the desired operating temperature and room temperature is substantial, as is the case e.g. when developing Ektacolor paper at 85° or 100° F., the temperature of the water in the outer jacket, even if its volume is relatively great, drops rapidly and with it the temperature of the treating solution in the treating tray. Thus, in fact, the material is not developed at the exact temperature, which is required usually to be in the range of ±0.5° F. or better of the nominal treating temperature. A major problem is the adjustment of the temperature of the water in the outer tray to the exact temperature, particularly when the treatment tray is contained therein. This is a very tedious and cumbersome operation and must be repeated every few minutes in the case of the above example, if the water temperature is to be kept halfway in the correct range.

Because of these and other disadvantages, the tray method has not found acceptance for the development of the high-quality color papers and films, even though the tray method is nearly exclusively used by the photographic amateur for the development of his black and white material. The exception is the professional, who has sufficient hot water to operate a thermostatically controlled mixing valve at the required high flow rates. This situation is not changed by the newly offered so-called "canoe-type" tray, which still depends for its temperature control on a water bath.

Figure 7:
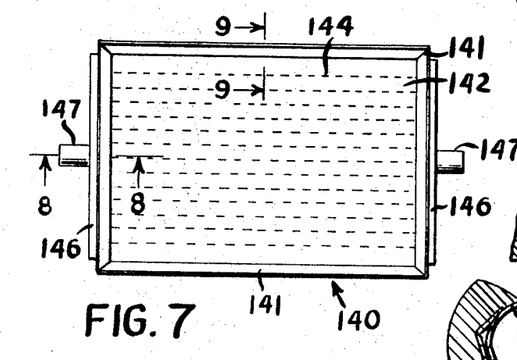
FIG. 7 is a top elevation, FIG. 8 an enlarged fragmentary vertical length section taken along line 8-8 of FIG. 7 and FIG. 9 an enlarged fragmentary vertical cross section, taken along line 9-9 of FIG. 7, of a new photographic treatment tray, which may be used with particular advantage for color development or similar treatment requiring very exact temperature control.
Figure 8:
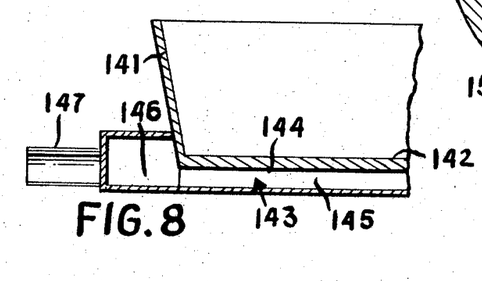
Figure 9:
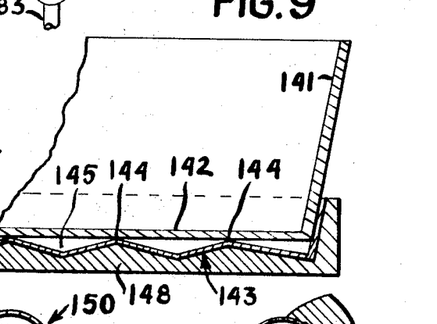

The new, improved photographic tray of the present invention permits to readily maintain the temperature of the solution contained in the tray at any desired level and in a range, which is well within a few tenths of a degree of the required temperature, thereby requiring only minimal amounts of hot water. This is achieved by providing underneath the tray bottom, and, if desired, at the sidewalls of the tray a thin passageway for passing a very thin layered stream of water along the outer bottom, and, if applicable, the outer sidewalls of the tray. This passage may be formed by a second, flat sheet of material, provided underneath the bottom and closely spaced thereto, as it is shown e.g. in FIG. 5 of my copending application Ser. No. 632,842 now U.S. Pat. No. 3,470,810. It is important thereby, that the space between the outer sheet and the tray bottom is kept very narrow, e.g. from less than 0.1 cm. to 0.5 cm. and not exceeding 1 cm. depending on the size of the tray. Only, if the passage has a thickness in this range, will constantly new, temperature-controlled water of the right temperature be in contact with the tray bottom for fast, accurate temperature control and heat exchange, when the temperature-controlled water, taken from a suitable water temperature control device or the like, is passed through the passage at a low or moderate flow rate. To assure stability and even thickness of the bottom passage, it is desired, to provide between the bottom and outer sheet spacers or the like and means for sealing the passage to the outside. Spacers and the like will not be necessary, if the lower passage is divided up into a plurality of individual, narrower passages, which are all fed from a distributor member into which the temperature-controlled water is introduced. An example of this type of tray, in which the passages have a triangular cross section, with the wide base of the triangle disposed toward the tray bottom, is illustrated in FIGS. 7 to 9. The basic tray 140, having slanted sidewalls 141 and bottom 142, is provided at its underside with corrugated sheet member 143, encasing the tray bottom on all sides in watertight fashion. The apeces of the member 143, being adjacent to the bottom, are preferably joined thereto, e.g. by heat welding, soldering, adhesives, cement or any other suitable manner of fastening. This manner of fastening of the sheet member provides individual, separate triangular passages 145 for the water. The passages are shown to run lengthwise, i.e. in the direction of the long sides of the tray; they may also be traverse, i.e. in the direction of the short sides of the tray. The sequence of triangular passages may also continue up along the sidewalls, if desired for still better temperature control. At each side, the triangular cross section passages 145 open into a distributor chamber 146, which extends across the tray faces, and which comprises tubular connectors 147 for the feeding of the temperature-controlled water and for the removal of the water, respectively, on the other side, e.g. for disposal into a sink or drain or for connection to the inlet of a second tray, if several trays are set up in a battery and fed by the water in series. The size of the entire open cross section represented by all the triangular passages 145 depends on the intended flow rate, at which the temperature-controlled water is to be fed to the tray and of course, on the pressure at which the water is to be run through the passages of the tray. If the flow rate and pressure, respective, of the incoming water is too low for a given cross section, the water does not flow evenly over the entire bottom area of the tray and the temperature-controlling effect is uneven and less than at the desired top efficiency. For an 8- × 10-inch tray, and at a flow rate of about 1 liter per minute of the water, the cross section may, depending on the particular design, material and arrangement be as low as 1 cm.$^2$ or less and up to about 6 cm.$^2$ or so, i.e. the vertical height of the triangular passages may be as small as 1 mm. to a few millimeters. As it reaches a value beyond about 10 mm., the tray becomes too inefficient to be acceptable for the purposes of the invention, because it consumes for efficient operation too much water in relation to the temperature-controlling effect exerted by this water. An 8- × 10-inch tray can efficiently be operated with a flow rate of as low as about 0.3 liter per minute, particularly, if a layer of insulation, as indicated at 148 in FIG. 9 is provided at the bottom and preferably also on the outside walls of the tray so as to sandwich the said passages 145 between the tray material and the outer insulation layer. The insulation may be any desired organic or inorganic material having satisfactory insulating qualities. Preferred are foamed organic materials such as foamed polyurethane, foamed polystyrene or foamed polyethylene etc. having a low specific weight and having preferably closed pores, as is well known in the art. The thickness of the insulating layer 148 may vary in wide ranges, depending on the insulating efficiency of the material. One-half to 1-inch foamed polyurethene of light weight provides excellent insulation sufficient for most uses of the tray.

The tray may be made from metal or any of the other suitable materials from which photographic trays are generally made. Both the tray 140 and the corrugated element 143, including distributor chambers 146 may with advantage be made from stainless steel, or they may be made from an organic plastic material, such as polyethylene, polypropylene or high-impact polystyrene copolymers or other suitable plastic materials well known in the art. Instead of having a triangular zigzag cross section, the corrugated member may have any other desired cross section, such as a curved or ondulating cross section, as long as as much as possible contact area is provided between the water in the passages and the tray bottom and tray walls, if applicable. The provision of the corrugated member 143 at the bottom gives strength and rigidity to the tray, so that the bottom may be made from a relatively thin material, e.g. one-fiftieth to one-twentieth of an inch thick, without being limited thereto, for better heat transfer. This is of particular importance with plastics which have a low heat transfer coefficient per se. The bottom layer of insulation 148, particular if rigid polyurethan foam is used, provides additional rigidity and strength, particularly if the whole lower portion of the tray is encased in a suitable outer protective material.

The new inventive concept may be employed with trays having any desired shape, trays being defined thereby as receptacles, in which the bottom area is relatively larger than any of the sidewalls. The inventive concept may be applied with particular benefit in a tray, which comprises a rounded concave bottom and likewise rounded sidewalls, each sidewall terminating at the top in an inwardly bending, overlapping wall section. The cross section of this type of tray may resemble roughly a half ellypsoid or a dog-bonelike cross section. Trays of this type are known as the canoe-type trays. As described before, the canoe-type tray comprises, in accordance with the present invention, at least one narrow passage along the bottom and preferably along most of the outside sidewall area. The passage may be of the double-bottom type described hereinbefore for the flat tray, or preferably is of the type of the plurality of individual passages extending longitudinally or preferably parallel to the length axis of the tray, as is illustrated e.g. in FIG. 10. If desired, the passages may extend also in any other desired direction, such as perpendicularly to the length axis of the tray.

Figure 10:
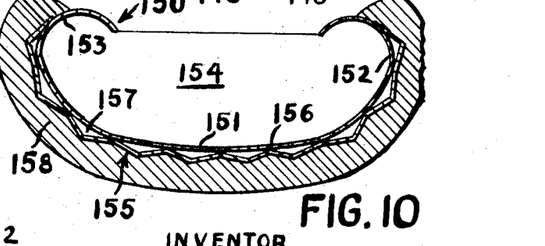
FIG. 10 is a vertical cross section of an improved photographic tray of the so-called "canoe type," which likewise is adapted for controlling the temperature of the treating solution within the tray in very narrow limits during photographic treatment therein.

Referring now to FIG. 10, the canoe-type tray is indicated at 150, with concave rounded bottom 151, concave rounded sidewalls 152 and inwardly overlapping, rounder terminal sections 153 at the top and end walls 154. To the bottom 151, sidewalls 152 and part of terminal sections 153 is joined corrugated member 155, having a shape and outline essentially identical to that of the tray, so that the inner apeces 156 of the member 155 contact and lie essentially flat against the adjoining portions of the tray bottom and walls all along the whole length of the tray. In this manner, triangular passages 157 are formed, having their wide base extending along the tray bottom and walls. These passages 157 serve, as described before, for the passage of a stream of temperature-conditioned water along the outside of the tray. At both ends of the tray are provided distributor chambers (not shown) which are similar to those shown in FIGS. 7 and 8 but have a length section and outline following the contours of the concave tray, so that all passages 157 open at each end in one of these chambers, respectively. The chambers are provided, as described before with tubular or other inlet and outlet connectors for the input and output of the water at the other end. At the outside of the corrugated member 155 is provided insulating layer 158, which preferably has a rounded outline, corresponding roughly to the outer contours of tray 150, permitting rocking of the tray for agitation and flowing of the solution over the sheet of photographic material contained in the tray. The rocking may be done manually, or preferably mechanically, e.g. by freely pivotally supporting the tray at the above-mentioned input and output connectors or nipples for the water (corresponding to members 147 in FIG. 7) and applying to one side a reciprocating member, which is mechanically reciprocated by a power source e.g. a small motor. If desired, the mechanical rocking action may be achieved by placing the tray on a platform, adapted for rocking in such manner, that the tray is rocked around its length axis. In this case, the lower portion of the layer of the insulating layer 158 may be shaped so as to have a flat bottom section. The mechanical rocking or tilting may also be effected with the flat tray shown in FIGS. 6 to 9. The tray may have any other desired shape and cross section, to accommodate and facilitate the agitation by rocking without spilling the solutions from the tray. The cross-sectional relations of the passages and the height of the passages, set out hereinbefore for the flat tray, apply in similar manner to the round bottom tray. Any of the modifications and additions described hereinbefore may also be made with the round bottom tray.

The passages may be provided in any desired size and number and width, as long as the additive cross section fulfills the requirement of providing the maximum contact and heat exchange area between the tray and the temperature-controlled water. The height of the individual passages, in the direction perpendicular to the tray bottom or wall, to which it adjoins, should preferably be in the range from 1 to 10 mm. or so, depending on the size of the tray and the intended flow rate of the water and the pressure at which the water is to be run through the passages. In exceptional cases, as with exceptionally large trays and the triangular configuration of the passages, they may be up to 15 or even 20 mm. high. However, as the thickness of the layer of water of the passages, respectively, increases, the efficiency of the heat exchange decreases. It is therefore much preferred to stay within the lower range up to 6 or 8 mm. or so. The use of the triangular or ondulating corrugated member 155 as the means for forming the individual passages has not only the advantage of the low cost in manufacture, but also the additional advantage, that the broad base of the water layer, having a triangular or partially circular cross section contacts the tray wall or bottom with less of the water in the outer portions, for maximum heat exchange area of a given amount of water. This expedient provides at the same time the assurance of uniform cross section of the individual passages over their whole length for maximum temperature control efficiency of a given volume of water. Of course, the provision of the corrugated member 155 at the outside provides a great mechanical strengthening effect, permitting to make the tray from much thinner material than would normally be needed for strength without the corrugated member joined thereto.

The inventive concept of providing one or more very narrow passages in contact with the tray walls and/or bottom, may be called "the thin layer heat exchange principle." This principle is new in the photographic art and is entirely different from the conventional water jacket principle, in which basically a rather large body of water surrounds the tray or tank, intended to maintain the temperature in the tray or tank by its "mass." In this water jacket principle, the water, as it changes its temperature by heat exchange and heat loss, must be replaced by running new water. Because of the relatively wide cross section of the water standing in the water jacket, the water injected at one end of the water jacket takes the shortest path of least resistance, leaving pockets of standing water of the wrong temperature. Attempts have been made to improve the performance of the water jacket by providing separate stirring devices or by running the incoming water at an unproportionally high flow rate as the means for creating turbulence and eddying for mixing and circulation. Neither expedient has solved the problem completely, aside from the fact, that in many locations, such as in the home of the photographic amateur, sufficient quantities of hot water are not available for this manner of operation. Contrary to this, in the thin later heat exchange principle of the present invention, the dimensions of the passages for the water are kept very small, and small enough to ensure, that the water flows at all times evenly and uniformly over the whole cross section of the passage. This excludes and makes impossible the formation of standing pockets of water of the wrong temperature. Since only those portions of the water, which are in direct contact with the heat exchange surface, are effective in and utilized for the heat exchange and temperature control, the thin layer heat exchange principle assures that all the water put into the device, is utilized for its heat-exchanging and temperature-controlling effect. There is no waste of hot water or heat energy. This permits to run the water for a given tray size at such very low flow rate, which would not be effective at all in the conventional water jacket. The heat exchange capacity and efficiency of the tray of the invention is in fact so high, that it is possible to construct the heat exchange surface, viz the tray bottom and sidewalls from a material which has only moderate heat transfer properties, such as many plastics, without detriment to the exactness and speed of the temperature control and without the need for higher flow rate of the water. This is an unexpected, unpredictable result and of great economical importance, because its permits the use of low cost plastics such as polyethylene, polypropylene, or high-impact polystyrene colpolymers, which because of their low price, low manufacturing cost and unexcelled corrosion resistance against the chemicals normally encountered in photographic developing processes are very desirable construction materials, which however, because of their low heat transfer properties could not be used in the past for the exact temperature requirements, such as needed in high-quality color development. Thus the new thin layer heat exchange principle of the present invention opens the way for new superior and much less costly tray equipment for the photographer.

Instead of running the water of the exact temperature continuously through the tray of the invention, while the treatment takes place therein, the tray may also be operated in accordance with the method described in my copending application Ser. No. 678,987 by running a stream, having slightly higher temperature (or slightly lower temperature in case cooling is desired) for a length of time, until the solution in the tray has achieved a certain intermediary temperature close to the desired operating temperature, whereupon the temperature between the water standing in the passages of the tray and the solution in the tray is permitted to equalize. This method is of particular value in those cases, where continuously running water of the exact desired temperature is not available, yet where the treatment is to be carried out at a temperature in very close limits, e.g. 0.2° or 0.3° F. or so of the desired nominal treating temperature. There is an afterheating effect in this method which tends to maintain the correct temperature for longer time than would be expected from the heat loss by radiation etc. The afterheating effect is increasing as the heat transfer properties of the tray bottom and walls decrease. This is not merely a question of insulation, but a phenomenon of such size that it far exceeds the heat preservation obtainable by insulation. Thus, when this method is used, the temperature constancy and the duration and length of time of temperature constancy can be readily controlled by the choice of material for the tray bottom and sidewalls of the most favorable heat transfer properties and of the most favorable thickness of the bottom and walls of the tray.

As many apparently widely different embodiments of this invention may be made without departing from the spirit and scope thereof, it is understood that the invention is not limited to the specific embodiments thereof, except as defined in the appended claims.

I claim:

1. A device for the provision of a stream of running water or other liquid having an essentially constant temperature, which device comprises inlet means for hot and cold water or other liquid, means for metering said hot and cold water or other liquid, said metering means having a metering orifice, at least one of said metering means being a precision metering valve rotationally adjustable for varying the size of the metering orifice, a mixing chamber for mixing said metered streams of hot and cold water or other liquid, said mixing chamber having a cross-sectional area, measured perpendicularly to the flow direction flow of the liquid therein, at least 20 times as great as the maximum cross-sectional area of said orifice of the largest of said metering means, said device comprising furthermore means for rotationally adjusting said adjustable metering means, thermosensitive control means in said mixed stream of water or other liquid for controlling the operation and direction of operation of said adjustable metering means in relation to the temperature of the outgoing mixed stream of water or other liquid, power-producing means other than said thermosensitive control means for driving said adjustable metering means, and means for metering the outgoing stream of mixed water or other liquid.

2. The device of claim 1, in which said thermosensitive control means is a thermocontroller of the adjustable type for setting the desired control temperature.

3. The device of claim 1, in which said thermosensitive control means in a thermostat.

4. The device of claim 1, which comprises in addition a pressure-compensating device for the hot and cold water or other liquid.

5. The device of claim 1, in which said mixing chamber has a cross-sectional area, which is at least 30 times as great as the maximum cross-sectional area of said orifice of the largest of said metering means.

6. The device of claim 1, in which said mixing chamber has a cross-sectional area, which is at least 50 times as great as the maximum cross-sectional area of said orifice of the largest of said metering means.

7. The device of claim 1, in which said power-producing means is at least one self-starting electric motor.

8. The device of claim 1, in which said adjustable metering means is a rotary stem-controlled needle valve.

9. The device of claim 7, in which said electric motor is of the electrically reversible type, so as to operate said rotationally adjustable metering means for increase or decrease of the orifice opening in either direction, as may be needed and indicated by said thermostat means, controlling the operation and direction of operation of said motor.

10. The device of claim 7, in which said motor drives means for rotation of the orifice control means by a small angle with each full rotation of the power output shaft of the motor, or speed-varying means associated thereto.

11. The device of claim 10, in which the adjustable metering means is a needle valve, comprising a rotational shaft and a gear wheel provided thereon, and the motor is coupled to mechanical means meshing with said gear wheel, so as to advance the gear wheel by one tooth with each full rotation of said output shaft of the motor or speed-varying means associated thereto.

12. The device of claim 8 which comprises two adjustable metering means and mechanical drive means adapted to cause the simultaneous rotational adjustment of both metering means in opposite sense.

13. The device of claim 1, in which said power-producing means is at least one water-driven turbine device.

14. The device of claim 13, in which said turbine comprises inlet ports at opposite sides for left-hand or right-hand operation as may be desired, and means for opening and closing either one or both of these ports controlled by said thermosensitive means.

15. The device of claim 14, in which said thermosensitive control means are temperature-sensitive elements causing mechanically the opening and closing of said ports.